United States Patent
Englund

(10) Patent No.: US 11,555,717 B2
(45) Date of Patent: Jan. 17, 2023

(54) ACOUSTIC METHOD AND SYSTEM FOR PROVIDING DIGITAL DATA

(71) Applicant: FIBER SENSE LIMITED, Mosman (AU)

(72) Inventor: Mark Andrew Englund, Mosman (AU)

(73) Assignee: Fiber Sense Limited, Mosman (AU)

( * ) Notice: Subject to any disclaimer, the term of this patent is extended or adjusted under 35 U.S.C. 154(b) by 527 days.

(21) Appl. No.: 16/348,962

(22) PCT Filed: Nov. 10, 2017

(86) PCT No.: PCT/AU2017/051235
§ 371 (c)(1),
(2) Date: May 10, 2019

(87) PCT Pub. No.: WO2018/085893
PCT Pub. Date: May 17, 2018

(65) Prior Publication Data
US 2020/0191613 A1    Jun. 18, 2020

(30) Foreign Application Priority Data
Nov. 10, 2016   (AU) ................................ 2016904592

(51) Int. Cl.
*G01D 5/353*   (2006.01)
*G01H 9/00*   (2006.01)
*G08B 13/16*   (2006.01)

(52) U.S. Cl.
CPC ......... *G01D 5/35361* (2013.01); *G01H 9/002* (2013.01); *G01H 9/004* (2013.01); *G08B 13/1672* (2013.01)

(58) Field of Classification Search
CPC .... G01D 5/35361; G01H 9/004; G01H 9/002; G08B 13/1672
(Continued)

(56) References Cited

U.S. PATENT DOCUMENTS 8,219,384 B2 * 7/2012 Lloyd ................... G10L 15/065
  704/251
8,255,217 B2 * 8/2012 Stent ....................... G10L 15/06
  704/231
(Continued)

FOREIGN PATENT DOCUMENTS

CN   101051869 A   10/2007
CN   102243795 A   11/2011
(Continued)

OTHER PUBLICATIONS

Englund, Mark Andrew, Extended European Search Report, EP17869895.7, Jun. 22, 2020, 22 pgs.
(Continued)

*Primary Examiner* — Jacques M Saint Surin
(74) *Attorney, Agent, or Firm* — Morgan, Lewis & Bockius LLP

(57) ABSTRACT

An acoustic system and method is disclosed for providing spatial and temporal classification of a range of different types of sound producing targets in a geographical area. The system includes an optical signal transmitter arrangement for repeatedly transmitting, at multiple instants, interrogating optical signals into each of one or more optical fibres distributed across the geographical area and forming at least part of an installed fibre-optic communications network. An optical signal detector arrangement receives, during an observation period following each of the multiple instants, returning optical signals scattered in a distributed manner over distance along the one or more of optical fibres. A processing unit demodulates acoustic data from the optical signals, processes the acoustic data and classifies it in accordance with the target classes or types to generate a plurality of datasets including classification, temporal and location-related data, and a storage unit stores the datasets in
(Continued)

parallel with raw acoustic or optical data which is time and location stamped so that it can be retrieved for further processing.

18 Claims, 12 Drawing Sheets

(58) Field of Classification Search
USPC .......................................................... 73/655
See application file for complete search history.

(56) References Cited

U.S. PATENT DOCUMENTS

| | | | | |
|---|---|---|---|---|
| 8,468,012 | B2 * | 6/2013 | Lloyd | G10L 15/065 |
| | | | | 704/251 |
| 8,488,799 | B2 * | 7/2013 | Goldstein | G10L 19/00 |
| | | | | 455/67.11 |
| 8,938,686 | B1 * | 1/2015 | Erenrich | G06F 40/143 |
| | | | | 715/781 |
| 9,996,229 | B2 * | 6/2018 | Erenrich | G06F 3/0484 |
| 10,337,807 | B2 * | 7/2019 | Richter | F28F 9/001 |
| 10,953,761 | B2 * | 3/2021 | Arai | B60L 53/302 |
| 2010/0158431 | A1 | 6/2010 | Huffman et al. | |
| 2012/0226452 | A1 | 9/2012 | Hill et al. | |
| 2016/0252414 | A1 | 9/2016 | Preston et al. | |
| 2020/0116556 | A1 * | 4/2020 | Cedilnik | G01L 1/242 |

FOREIGN PATENT DOCUMENTS

| | | | | |
|---|---|---|---|---|
| CN | 105096490 | * | 11/2015 | ........... G08B 13/186 |
| WO | WO 2015/158926 A1 | | 10/2015 | |

OTHER PUBLICATIONS

Englund, Mark Andrew, International Search Report and Written Opinion, PCT/AU2017/051235, dated Feb. 15, 2018, 13 pgs.
Englund, Mark Andrew, International-Type Search Report, Australian Patent Application No. 2016904592, dated Jan. 27, 2017, 9 pgs.

* cited by examiner

| | Activty Detector | Manual Digging ... | Mechanical Digg... | Personnel Detector | Stealth Detector | Vehicle Detector | Rail Detector |
|---|---|---|---|---|---|---|---|
| SY1 | On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed |
| T2 Airport Link | ◉On ○Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed |
| Regent St Redfern | ◉On ○Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed |
| Redfern Station | ◉On ○Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed |
| Ivy St | ◉On ○Off ○Ignored ○Timed | ○On ◉Off ○Ignored ○Timed | ○On ◉Off ○Ignored ○Timed | ◉On ○Off ○Ignored ○Timed | ○On ◉Off ○Ignored ○Timed | ○On ◉Off ○Ignored ○Timed | ○On ◉Off ○Ignored ○Timed |
| Hyde Park | ◉On ○Off ○Ignored ○Timed | ○On ◉Off ○Ignored ○Timed | ○On ◉Off ○Ignored ○Timed | ◉On ○Off ○Ignored ○Timed | ○On ◉Off ○Ignored ○Timed | ◉On ○Off ○Ignored ○Timed | ○On ◉Off ○Ignored ○Timed |
| Harbour Tunnel | ◉On ○Off ○Ignored ○Timed | ○On ◉Off ○Ignored ○Timed | ○On ◉Off ○Ignored ○Timed | ◉On ○Off ○Ignored ○Timed | ○On ◉Off ○Ignored ○Timed | ◉On ○Off ○Ignored ○Timed | ○On ◉Off ○Ignored ○Timed |
| Hebet St | ◉On ○Off ○Ignored ○Timed | ○On ◉Off ○Ignored ○Timed | ○On ◉Off ○Ignored ○Timed | ◉On ○Off ○Ignored ○Timed | ○On ◉Off ○Ignored ○Timed | ◉On ○Off ○Ignored ○Timed | ○On ◉Off ○Ignored ○Timed |
| Delhi Rd Constru... | ◉On ○Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed | ○On ◉Off ○Ignored ○Timed |

FIG. 6

ACOUSTIC METHOD AND SYSTEM FOR PROVIDING DIGITAL DATA

CROSS REFERENCE TO RELATED APPLICATIONS

This Application is a United States National Stage Application filed under 35 U.S.C. § 371 of PCT Patent Application Serial No. PCT/AU2017/051235 filed on Nov. 10, 2017, which claims the benefit of and priority to Australian Patent Application No. 2016904592 filed on Nov. 10, 2016, each of which is hereby incorporated by reference in its entirety.

FIELD OF THE INVENTION

The present disclosure generally relates to an acoustic method and system for providing digital data. In particular, the present disclosure relates to an acoustic method and system for providing digital data collected over a geographical area, such as a city or an urban area.

BACKGROUND OF THE INVENTION

Wide area surveillance refers to real-time close observation in a geographical area, such as a city or an urban area. Wide area surveillance can be useful for monitoring of targets, such as vehicle and pedestrian traffic, and for law enforcement purposes, such as monitoring social disturbances or criminal activity. Wide area surveillance may be used in conjunction with a geographic information systems (GIS) overlay to assist in surveillance and monitoring across a mapped region.

Known wide area surveillance systems include those employing visual means, which collect visual information for surveillance. For example, closed-circuit television (CCTV) cameras have been used to monitor city streets. Each CCTV camera can provide one localised view of a streetscape at any one time with a depth of field of view determined by the optics of the CCTV camera. In case of a system with multiple CCTV cameras, the blind spots or the visually least clear spots in the city are potentially locations mid-way between CCTV cameras or outside a CCTV camera's field of view. As another example, street views captured by a camera system mounting on a moving vehicle can provide visibility of some of these blind spots, but the street view images are static and impractical to be regularly updated for live monitoring. As yet another example, satellite imagery can provide a city-wide bird's eye view of objects that are in the satellite's unobstructed line-of-sight. Targets or events that are visually obstructed (e.g. underground, under thick clouds, within a building or under bridges or flyovers) would therefore lack surveillance visibility from satellite images, which are also static.

Other known wide area surveillance systems include those employing radio means. For example, cellular signals from mobile devices carried by users may be used to provide surveillance information on, for instance, the number of people in proximity of, and their locations from, a cell tower by determining the number of cellular connections and signal strength or signal information. The surveillance information obtainable from cellular signals may not be a reliable representation of the true number of people and their approximate locations with respect to a cell tower. A person in the area may well carry none or multiple mobile devices or have their mobile device switched off. Further, mobile device signals vary in strength across different devices and some may be penetrating or reflected off buildings such that the signal strength becomes an unreliable indicator of distance. Not every person would be carrying a single, transmitting mobile device with consistent signal power in radio line-of-sight of a cell tower at all times. In addition mobile devices are not reliably able to convey classification data about the object they are associated with, in that they may be associated with more than one object.

A further example is in the form of arrays of inductive loops deployed at traffic light intersections for detection of vehicles on roads. This system can only detect metal vehicles and as such cannot detect pedestrians and other biologics, and can only detect across limited zones.

Lidar looking down on city areas has similar limitations as a satellite as it is line of sight only and will have blind spots. It is also non trivial to detect and classify the presence of distinct objects from the measurement field (eg cars, pedestrians, bicycles, trucks etc).

Reference to any prior art in the specification is not, and should not be taken as, an acknowledgment or any form of suggestion that this prior art forms part of the common general knowledge in any jurisdiction or that this prior art could reasonably be expected to be understood, regarded as relevant and/or combined with other pieces of prior art by a person skilled in the art.

SUMMARY OF THE INVENTION

In one aspect there is provided an acoustic method of providing spatial and temporal classification of a range of different types of sound producing targets in a geographical area, the method including the steps of: repeatedly transmitting, at multiple instants, interrogating optical signals into each of one or more optical fibres distributed across the geographical area and forming at least part of an installed fibre-optic communications network; receiving, during an observation period following each of the multiple instants, returning optical signals scattered in a distributed manner over distance along the one or more of optical fibres, the scattering influenced by acoustic disturbances caused by the multiple targets within the observation period; demodulating acoustic data from the optical signals; processing the acoustic data and classifying it in accordance with the target classes or types to generate a plurality of datasets including classification, temporal and location-related data; and storing the datasets in parallel with raw acoustic data which is time and location stamped so that it can be retrieved for further processing and matched with the corresponding datasets to provide both real time and historic data.

The method may include generating the acoustic signatures of a number of sound producing targets.

The method may include classifying the acoustic data by correlating it with acoustic signatures associated with each of the target classes or types.

The method may include the step of classifying the sound producing targets as symbols representative of the sound producing targets and storing the symbols as part of the datasets in a digital symbol index.

The method may include storing together with the datasets raw acoustic data which is time and location stamped so that it can be retrieved for further processing and matched with the corresponding datasets.

In one aspect, the step of correlating the acoustic data with acoustic signatures includes applying acoustic signature-based filters to detect the acoustic targets.

The method may include receiving a search request directed towards one or more of the classification, temporal or location-related data, and using the data in conjunction with a GIS overlay, including representing target classes or types as symbols.

In one aspect, the step of classifying the acoustic data includes the application of AI or machine learning based algorithms.

The sound producing targets may include sound producing objects, sound producing events or combinations of sound producing objects and events.

The method may include processing or representing the datasets together with surveillance data obtained from at least one non-acoustic sensing system.

The method may include generating alert criteria associated with the respective acoustic signatures, and triggering an alarm or warning in the event of the alert criteria being triggered.

The classification data may be obtained or a classification algorithm may be trained using data from at least one non-acoustic sensing system.

The non-acoustic sensing system may include at least one of a moving image capturing system, a machine vision system, a satellite imagery system, a closed-circuit television system, and a cellular signal based system.

The search request may be based on data obtained from at least one non-acoustic sensing system.

The datasets may be converted into a real time virtual world digital emulation including a GIS overlay.

The interrogating and returning optical signals may be generated within the one or more optical fibres using time domain multiplexing or polarisation modes.

The method may include receiving a search request directed towards one or more of the classification, temporal or location-related data, and using the data in conjunction with a GIS overlay, including representing target classes or types as symbols.

The method may further include generating a higher order symbol index database including dynamic symbol data associated with velocity and direction, and with alert criteria.

The optical fibres may include one or more unlit optical fibres or unused spectral channels in the installed fibre-optic communications network, and the fibre-optic optic communications network is a high density public telecommunications network.

Beam forming techniques may be used on the retrieved and processed raw optical data and/or on the demodulated acoustic data.

The method may extend to monitoring a plurality of different footprints in the geographic area, each footprint comprising at least one virtual optical fibre network made up of at least one segment of segments of the at least one optical fibre and being associated with an entity or subscriber.

The method may include obtaining at least location related data associated with each footprint and processing this data with that of the generated datasets to provide dedicated datasets associated with each footprint, the location related data corresponding to the virtual fibre network.

The disclosure extends to a computer readable storage medium storing one or more programs, the one or more programs comprising instructions, which when executed by a processor, enable the spatial and temporal classification of a range of different types of sound producing targets in a geographical area, by executing one or more of the methods summarised above.

The disclosure extends to an acoustic system for providing spatial and temporal classification of a range of different types of sound producing targets in a geographical area, the system including: an optical signal transmitter arrangement for repeatedly transmitting, at multiple instants, interrogating optical signals into each of one or more optical fibres distributed across the geographical area and forming at least part of an installed fibre-optic communications network; an optical signal detector arrangement for receiving, during an observation period following each of the multiple instants, returning optical signals scattered in a distributed manner over distance along the one or more of optical fibres, the scattering influenced by acoustic disturbances caused by the multiple targets within the observation period; a processing unit for demodulating acoustic data from the optical signals, processing the acoustic data and classifying it in accordance with the target classes or types to generate a plurality of datasets including classification, temporal and location-related data, and a storage unit for storing the datasets in parallel with raw acoustic data which is time and location stamped so that it can be retrieved for further processing and matched with the corresponding datasets to provide both real time and historic data.

The processing unit may be configured to detect the acoustic targets by correlating the acoustic data with acoustic signatures associated with each of the target classes or types, and may include acoustic signature-based filters to detect the acoustic targets.

The system may further include an acoustic signature generator for generating the acoustic signatures of a number of sound producing targets.

The processing unit may be configured to classify the sound producing targets as symbols representative of the sound producing targets and storing the symbols as part of the datasets in a digital symbol index database in the storage unit.

The acoustic signature-based filters may be finite impulse response or cross-correlation filters.

The system may include a search request interface for receiving a search request directed towards one or more of the classification, temporal or location-related data, and a display for displaying the data in conjunction with a GIS overlay, including representing target classes or types as graphic symbols.

The system may further include a higher order symbol index database including dynamic symbol data associated with velocity and direction, and with alert criteria.

The system may still further include or be operable with at least one non-acoustic sensing system and the processing unit is configured to process or represent the datasets together with surveillance data obtained from the non-acoustic sensing system.

The classification data may be obtained or a classification algorithm may be trained using data from the at least one non-acoustic sensing system.

The non-acoustic sensing system may include at least one of a moving image capturing system, a machine vision system, a satellite imagery system, a closed-circuit television system, and a cellular signal based system.

The system may include or be configured to access cloud based storage for storing raw optical data for subsequent retrieval and processing.

The processing unit may be configured to use beam forming techniques on the retrieved and processed raw optical data and/or on the demodulated acoustic data.

The processing unit may be configured to monitor a plurality of different footprints in the geographic area, each footprint comprising at least one virtual optical fibre network made up of at least one segment of segments of the at least one optical fibre and being associated with an entity or subscriber.

The processing unit may be configured to obtain at least location related data associated with each footprint and process this data with that of the generated datasets to provide dedicated datasets associated with each footprint, the location related data corresponding to the virtual fibre network.

The processing unit may include a semantics engine to assess a threat or alert level associated with a target, and an alarm is generated in the event of the threat or alert level exceeding a threshold.

The disclosure extends to an acoustic system for providing spatial and temporal classification of a range of different types of sound producing targets in a geographical area, the system including: an optical signal transmitter arrangement for repeatedly transmitting, at multiple instants, interrogating optical signals into each of one or more optical fibres distributed across the geographical area and forming at least part of an installed fibre-optic communications network; an optical signal detector arrangement for receiving, during an observation period following each of the multiple instants, returning optical signals scattered in a distributed manner over distance along the one or more of optical fibres, the scattering influenced by acoustic disturbances caused by the multiple targets within the observation period; an A/D converter for converting the optical signals to optical data; a storage unit for storing the optical data, the optical data including temporal and location related data; a communications interface and processor for receiving a search request including temporal and location related filters or parameters, and retrieving the optical data based on said parameters for processing it into acoustic data.

The system may include a processing unit configured to demodulate acoustic data from the optical signals; process the acoustic data and classify it in accordance with the target classes or types to generate a plurality of datasets including classification, temporal and location-related data, and storing the datasets in the storage unit.

The processing unit may be configured to process the optical data into acoustic data at a resolution based on the temporal and location based parameters, the processing unit being arranged to retrieving the acoustic data at a desired resolution for beam forming at a desired location.

Further aspects of the present invention and further embodiments of the aspects described in the preceding paragraphs will become apparent from the following description, given by way of example and with reference to the accompanying drawings.

BRIEF DESCRIPTION OF THE DRAWINGS

FIG. 6 illustrates one example of a subscriber interface for use in an embodiment of the method and system.

DETAILED DESCRIPTION OF EMBODIMENTS

Figure 1:
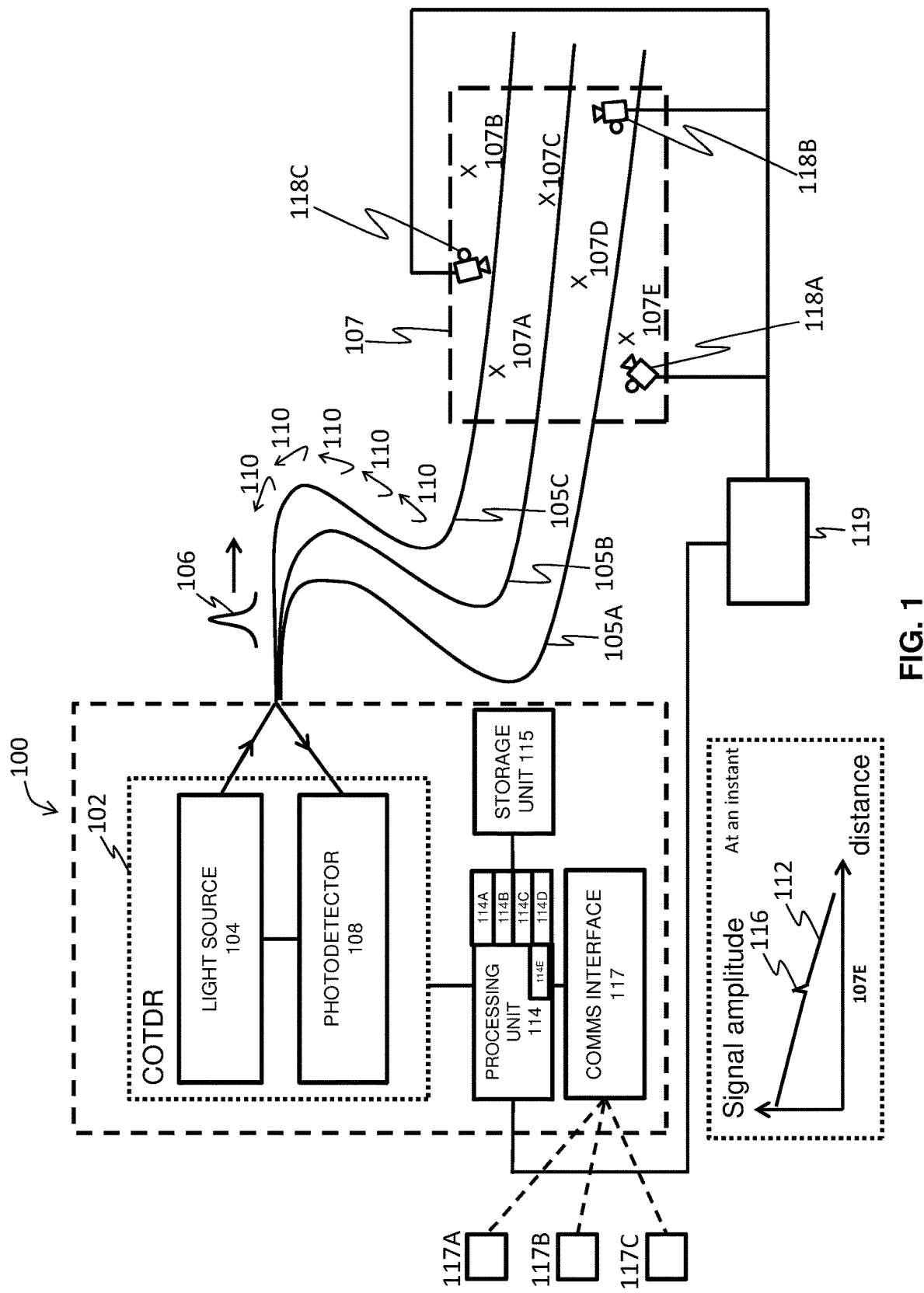
FIG. 1 illustrates an example of a system for providing digital data.

The present disclosure relates to an acoustic method and system for the provision of digital data for the purposes of optimisation, search, situational awareness, safety, surveillance, monitoring and the like. The inventor has recognised shortcomings associated with visual or radio surveillance and monitoring techniques mentioned in the background. Disclosed herein is a method and system for providing surveillance data devised in view of these issues. The present disclosure provides an alternative method and system to those techniques or systems mentioned in the background, or a supplemental method and system that can be used in conjunction with those techniques or systems mentioned in the background.

The surveillance data can relate to real-time acoustic data for monitoring targets. Alternatively or additionally, the surveillance data relates to historic acoustic data for later retrieval and searching. In general, "targets" include any acoustic objects that vibrate and therefore generate detectable acoustic signals, such as vehicles (generating tyre/engine noise), pedestrians (generating footsteps), trains (generating rail track noise), building operations (generating operating noise), and road, track or infrastructure works (generating operating noise). They also include events caused by targets, such as car crashes, gunshots caused by a handgun or an explosion caused by explosives (generating high-pressure sound waves and reverberation).

The disclosed system and method make use of fibre optic distributed acoustic sensing to provide spatial and temporal surveillance and monitoring data within a geographical area, such as a city, utilising one or more optical fibres distributed across the geographical area. Such a sensing technique relies on the occurrence of a nearby acoustic event causing a corresponding local perturbation of refractive index along an optical fibre. The required proximity of the acoustic event depends on noise floor of the sensing equipment, the background noise, and the acoustic properties of the medium or media between the acoustic event and the optical fibre. Due to the perturbed refractive index, an optical interrogation signal transmitted along an optical fibre and then back-scattered in a distributed manner (e.g. via Rayleigh scattering or other similar scattering phenomena) along the length of the fibre will manifest in fluctuations (e.g. in intensity and/or phase) over time in the reflected light. The magnitude of the fluctuations relates to the severity or proximity of the acoustic disturbance. The timing of the fluctuations along the distributed back-scattering time scale relates to the location of the acoustic event.

It will be appreciated that by the term 'distributed acoustic sensing' is meant sensing a source that has an acoustic component. This acoustic component may translate to a vibrational or seismic component when travelling though the earth or a solid body before causing local perturbation in a buried fibre optic cable.

Reference to acoustic data in this disclosure should be read as including any propagating wave or signal that imparts a detectable change in the optical properties of the sensing optical fibre. These propagating signals detected in the system may include signal types in addition to acoustics such as seismic waves, vibrations, and slowly varying signals that induce for example localised strain changes in the optical fibre. The fundamental sensing mechanism in one the preferred embodiments is a result of the stress-optic effect but there are other scattering mechanisms in the fibre that this disclosure may exploit such as the thermo-optic effect and magneto-optic effect.

Reference to acoustic data also needs to be read in context with optical data. The raw optical data in the preferred embodiment is stream of repeating reflection sets from a series of optical pulses directed down the sensing fibre. These reflection sets are sampled at very high rates (in the order of gigabits per second) and are demodulated into a series of time windows that correspond to a physical location along the optical fibre. The data in these time windows is used to demodulate the integrated strain along the local length of the fibre at that time. The integrated strain contains signals such as acoustics, seismic, vibration and other signals that induce strain on the fibre. The integrated strain data from demodulation results in much smaller data rates than the optical data collected (in the order of megabits per second). The extent of the time window bins is selectable and is done so based on compromises between spatial resolution of sensor channels, signal frequency range, dynamic range, and maximum length range of the system. While the acoustic data is more efficient to store in terms of data set size, storing the optical data set allows for any one of the demodulations parameters to be changed and new demodulated data generated with a different set of selections for spatial resolution of sensor channels, signal frequency range, dynamic range, maximum length range of the system. This flexibility is important to optimise the system for disparate sensing tasks that may require particular locations or areas to be re-processed with different configurations that enhance detection, classification, tracking, counting and/or further signal analysis of acoustic sources of interest.

In one example, a system 100 for use in distributed acoustic sensing (DAS) is illustrated in FIG. 1. The DAS system 100 includes a coherent optical time-domain reflectometer (C-OTDR) 102. The C-OTDR 102 includes a light source 104 to emit an optical interrogation field 106 in the form of a short optical pulse to be sent into each of optical fibres 105A, 105B and 105C. The optical fibres 105A, 105B and 105C are distributed across a geographical area 107. The C-OTDR 102 includes a photodetector 108 configured to detect the reflected light 110 scattered in a distributed manner and produce a corresponding electrical signal 112 with an amplitude proportional to the reflected optical intensity resolved over time. The time scale may be translated to a distance scale relative to the photodetector 108. An inset in FIG. 1 illustrates a schematic plot of such signal amplitude over distance at one particular instant. The DAS system 100 also includes a processing unit 114, within or separate from the C-OTDR 102, configured to process the acoustic fluctuations 116 in the electrical signal 112.

These acoustic fluctuations are acoustic signals that contain a number of different acoustic frequencies at any one point and also along a series of different spatial points that the processing unit will convert to a digital representation of the nature and movement of the sound targets around the cable grid. In contrast to scalar measurands such as temperature (which typically don't provide any dynamic information above a few Hz, so it is not feasible to determine what type of heat sources are around the cable and how they are moving), acoustic signals contain a significant number of frequency components (up to many kHz's, which are unique and distinguishable to a specific target type) and vector information. i.e. the amplitude information derived from the Fourier domain (of single channels) and the multi-channel time domain (spatial information such as direction of the "target" and the spatial position for facilitating GIS overlay and velocity parameters (speed and acceleration).

The digitised electrical signal 112, any measured fluctuations 116 and/or processed data associated therewith may be stored in a storage unit 115. The storage unit 115 may include volatile memory, such as random access memory (RAM) for the processing unit 114 to execute instructions, calculate, compute or otherwise process data. The storage unit 115 may include non-volatile memory, such as one or more hard disk drives for the processing unit 114 to store data before or after signal-processing and/or for later retrieval. The processing unit 114 and storage unit 115 and may be distributed across numerous physical units and may include remote storage and potentially remote processing, such as cloud storage, and cloud processing, in which case the processing unit 114 and storage unit 115 may be more generally defined as a cloud computing service.

FIGS. 2A, 2B, 2C, 2D and 3A illustrate various examples of the disclosed method 200. The disclosed method 200 includes the step 202 of transmitting, at multiple instants 252A, 252B and 252C, interrogating optical signals or fields 106 into each of one or more optical fibres (e.g. one or more of 105A, 105B and 105C) distributed across a geographical area (e.g. 107), which is typically an urban environment. The optical fibres typically form part of a public optical fibre telecommunications network which provides a high degree of coverage (practically ubiquitous) in an urban and particularly inner city environment. The disclosed method 200 also includes the step 204 of receiving, during an observation period (254A, 254B and 254C) following each of the multiple instants 252A, 252B and 252C, returning optical signals (e.g. 110) scattered in a distributed manner over distance along the one or more of optical fibres (e.g. one or more of 105A, 105B and 105C).

This configuration permits determination of an acoustic signal (amplitude, frequency and phase) at every distance along the fibre-optic sensing cable. In one embodiment, the photodetector/receiver records the arrival times of the pulses of reflected light in order to determine the location and therefore the channel where the reflected light was generated along the fibre-optic sensing cable. This phased array processing may permit improved signal-to-noise ratios in order to obtain improved detection of an acoustic source, as well as the properties of the acoustic source.

Substantially total sensing area coverage of a particular city area is an important aspect of this disclosure. The density of the grid formed by the fibre paths may be limited in certain geographies owing to existing buildings or facilities or other restrictions. Beam forming through phased array processing of an ensemble of adjacent sensor channels is able to significantly extend the sensing range perpendicular to a given position along the fibre. Beamforming can therefore be used to ensure the area that is covered by the sensing range of the fibre grid has minimal gaps or areas where a sound source may not be detected.

Beamforming techniques involve the addition of phase-shifted acoustic fields measured at different distances (or channels) along the fibre-optic sensing cable by injecting a series of timed pulses. These beamforming techniques may result in several intersecting narrow scanning beams that may yield direction of the acoustic source and its location relative to the fibre-optic sensing cable in two or three dimensions in order to selectively monitor different zones in the acoustic field with improved array gain range and enhanced detection capabilities, with the scanning beams being designed to supplement and improve coverage. In high traffic areas or dense sensing environments requiring close monitoring beam-forming techniques may also be effectively employed as they provide high levels of spatial discrimination.

The disclosed method 200 also includes the step 206 of demodulating acoustic data from the optical signals 110 associated with acoustic disturbances caused by the multiple targets detected within the observation period (254A, 254B and 254C).

At step 208 acoustic signature-based filters 114A, 114B, 114C and 14D are applied to the acoustic data to detect acoustic objects/events. These filters could be in the form of software-based FIR (finite impulse response) or correlation filters, or classification could alternatively be implemented using big data and machine learning methodologies. This latter approach would be applicable where higher levels of discrimination of sound objects is required, such as details of vehicle type or sub-class or sub-classes of other objects.

At step 209, raw or unfiltered acoustic data is fed in parallel from demodulation step 206 and stored in the storage unit 215, which may include cloud-based storage 215A. It is similarly time and location stamped, so that it can be retrieved at a later stage to be matched at 213 with symbols stored in a digital symbol index database for allowing additional detail to be extracted where possible to supplement the symbol data.

In addition or as an alternative to the raw acoustic data being stored, raw optical signals may be digitised by an A/D converter and stored as raw optical data at step 204A prior to demodulation in cloud storage facility 215A. Whilst this will require substantially more storage capacity it has the advantage of preserving the integrity of all of the backscattered optical signals/data without losing resolution as a result of sampling frequencies and the like, and retaining all time and location-based data. This stored optical data may then be retrieved for analysis at a later stage. An advantage of storing raw optical data is that the above described beamforming techniques may be applied to the data to result in higher resolution detection and monitoring. If stored, the optical data can be retrieved, processed and re-processed to provide new acoustic data that can change beamforming performance by adjusting channel spacing and frequency range, for example.

At step 210, symbols representative of sound objects and/or sound events are generated and stored in the digital symbol index database. Each symbol index includes an event/object identifier with time and location stamp). Event/object identifiers could include pedestrians, cars, trucks, excavators, trains, jackhammers, borers, mechanical diggers, manual digging, gunshots and the like. The series of different software-based correlation filters 14A-14D is provided for each classification type above (each correlation filter is tuned to particular characteristics in the acoustic time series and acoustic frequency domain) and once the output of one of these software based filters reaches a threshold, a detection and classification event is triggered in the system. The system now has a digital representation of an object with properties such as what the object is, where it is located geographically, how fast is it moving and a host of other properties that can be deduced from the acoustic data associated with this object.

Alert criteria are stored with the symbol index database at step 212, with each symbol having at least one associated alert criterion (threshold amplitude/frequency). The alert criteria may form part of a semantics or context engine 114E in the processing unit which processes a number of factors which can be used to determine the level of threat or danger associated with an event, and thereby deliver actionable information. For example, in the case of an excavator, the speed and direction of movement of the excavator is factored in. Other information received via the communications interface 117 could include the identity of the excavator/entity performing the works so that it could be identified and alerted in the event of being in danger of damaging or severing the cable. In addition if the excavator was associated with a known and reliable contractor then this would be factored in to the decision making process.

Other information could include that relating to the location of all public works being conducted in the geographic area, so that an excavation or intrusion event detected at a location where there are no known operations or at a time of day where no operations are expected is allocated a higher alert or alarm status. Another example of actionable information would be information which showed that the excavator or other vehicle was being driven or operated in an erratic manner. Threat levels may be indicated both graphically using say a familiar green, orange and red colour scheme, and flashing symbols and audibly using audible alarms of progressively increasing volume.

At step 218 a higher order symbol index database is optionally generated with dynamic symbol data (current velocity and current direction) and optional alert criteria (eg velocity limits). Again the higher order symbol index database could be associated with the context engine 114E to assess alert criteria. If alert criteria are triggered at 214, an alarm or warning is triggered at 216, and the cycle is repeated with transmission step 202. It will be appreciated that there may be more than one trigger event per cycle.

This process of forming a "digital representation of what is present" is possible to do with machine vision acting on a video feed but is generally more complicated and expensive to implement (significant computational overhead and a large number of camera feeds and massive bandwidth required, due to increase in carrier frequency from kHz in the case of sound to THz in the case of light. Sound doesn't have the ability to image the fine physical features of a given object that light can render in a video or from related techniques such as a LIDAR feed. However over a wide urban area like a city or group of cities, sound has been identified as an ideal and very efficient field (among many choices—light, RF, magnetic, electric, temperature, seismic) to detect a wide range of objects and events and their properties. This is key to the physical world search (PWS) capability described in this disclosure being feasible once a large scale acoustic sensor system is fully deployed.

Figure 3A:
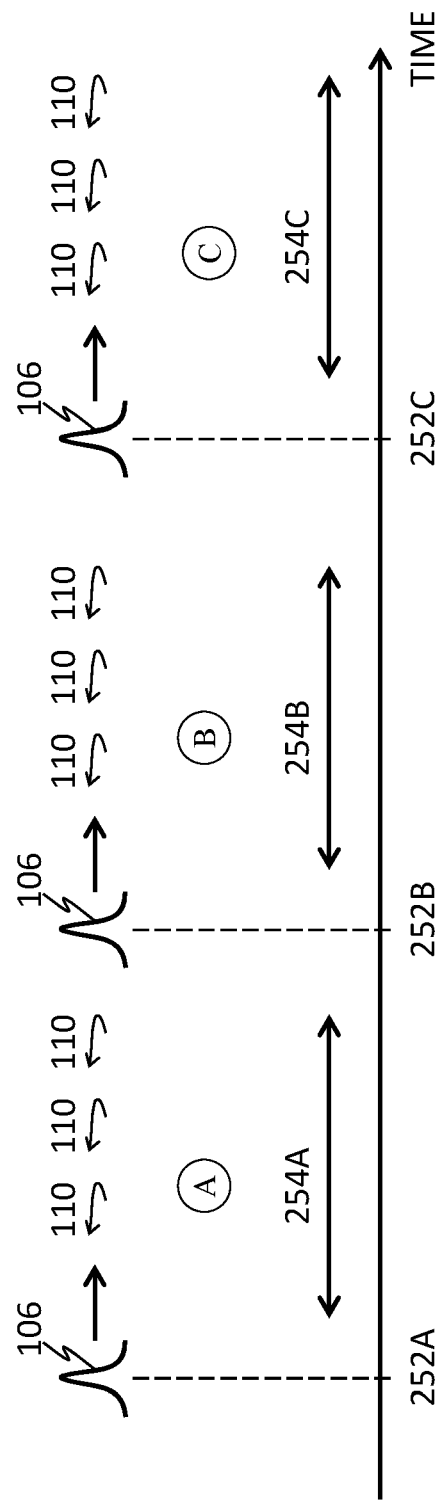
FIG. 3A illustrates schematically a transmission sequence of interrogating optical signals at multiple instants and a sequence of corresponding observation windows.
Figure 3B:
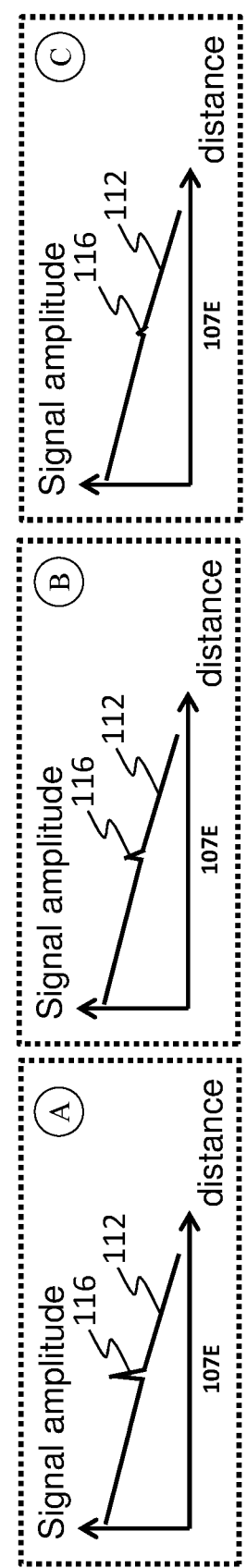
FIG. 3B illustrates schematically an example of amplitude vs distance plots provided by a system of the present disclosure.

The recorded electronic data includes acoustic information representing approximate locations (e.g. 107A to 107E) of the multiple targets within or near the geographical area (e.g. 107) and associated with the multiple instants 252A, 252B and 252C. The approximate locations (e.g. 107A to 107E) are inferred from the distance along the one or more optical fibres (e.g. one or more of 105A, 105B and 105C). FIG. 3B illustrates a schematic plot of signal amplitude over distance for each of the instants 252A, 252B and 252C.

In one arrangement, the optical fibres utilised to facilitate gathering surveillance data may form or be a part of a network of optical fibres. The work may be an established fibre-optic communications network, in recognition of a scenario where fibre-optic communications networks are often installed with more communications capacity than required at the time of installation. In one form, the under-utilised communications capacity includes one or more unlit optical fibres. For example, a fibre-optic bundle may include multiple optical fibres, one or more of which are configured to carry communications information while the others remain unlit until the lit ones reaches capacity. These unlit optical fibres may therefore be borrowed or otherwise utilised for obtaining surveillance information according to the present disclosure. In another form, the extra communications capacity includes one or more unused spectral channels.

As an alternative or in addition time-domain-multiplexing of the C-OTDR function with a telecommunication function in the same spectral channel may be employed. The C-OTDR may be spectrally overlapped with telecommunication channels by synchronising when the optical field (for the C-OTDR function this could be both discrete pulses or continuous optical fields in spread spectrum modulation techniques) sent or associated with the C-OTDR function and when it was associated with the Telecommunication function.

The one or more unused spectral channels may include wavelengths outside the wavelength range used in the optical fibres for communications purposes. For example, if all optical fibres in the fibre-optic bundle are lit, and the communications wavelengths in the optical fibres span the C band (between approximately 1530 nm and approximately 1563 nm) and the L band (between approximately 1575 nm and approximately 1610 nm) for communications purposes, one or more unused wavelengths at outside the C band or the L band nm may be utilised for obtaining surveillance information according to the present disclosure. The particular selection of the one or more unused wavelengths may be based on the gain spectrum of any existing erbium-doped fibre amplifiers (EDFAs) deployed in the communications network for extending its reach. Where existing EDFAs are deployed, selecting the one or more unused wavelengths from discrete wavelengths at 1525 nm, 1569 nm and 1615 nm (i.e. just outside the C and L bands) enables amplification without the need for additional EDFAs to extend the reach of interrogation signals. In another arrangement, the network may include a dedicated network for acoustic sensing purposes, operating in conjunction with an established network for fibre-optic communications, to extend the reach of acoustic sensing. The major advantage of using an existing communications network is that no dedicated cables have to be deployed at an additional and very significant cost.

The optical fibres are distributed across the geographical area to substantially cover the geographical area, in contrast to optical fibre deployment along a perimeter of the geographical area (e.g. surrounding a secure building or campus) or deployment covering in a substantially linear or elongate space (e.g. along a long gas or oil pipe). The distribution may be substantially even to cover the geographical area.

Alternatively, the distribution may be denser to cover some portion(s) of the geographical area in higher spatial resolution than others, which is typically the case in inner city/urban areas, or other areas with high fibre optic coverage, as a result of the NBN network in Australia for example.

Figure 4B:
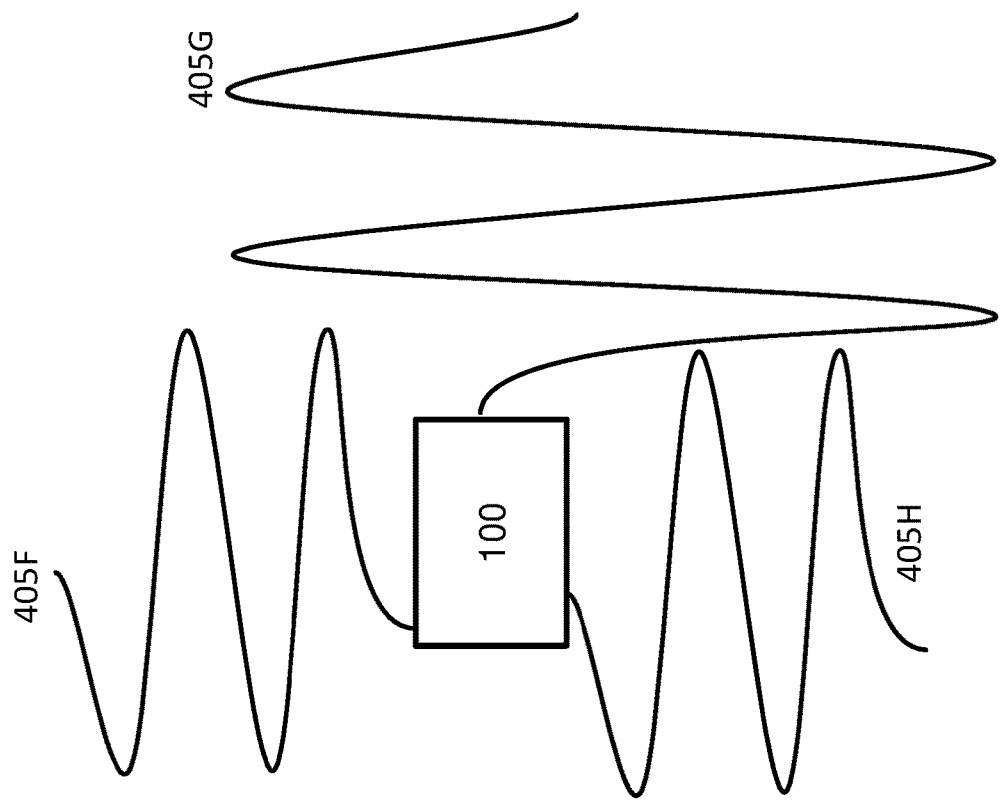
FIG. 4B illustrates another schematic distribution geometry of optical fibres utilised for obtaining digital data.
Figure 4A:
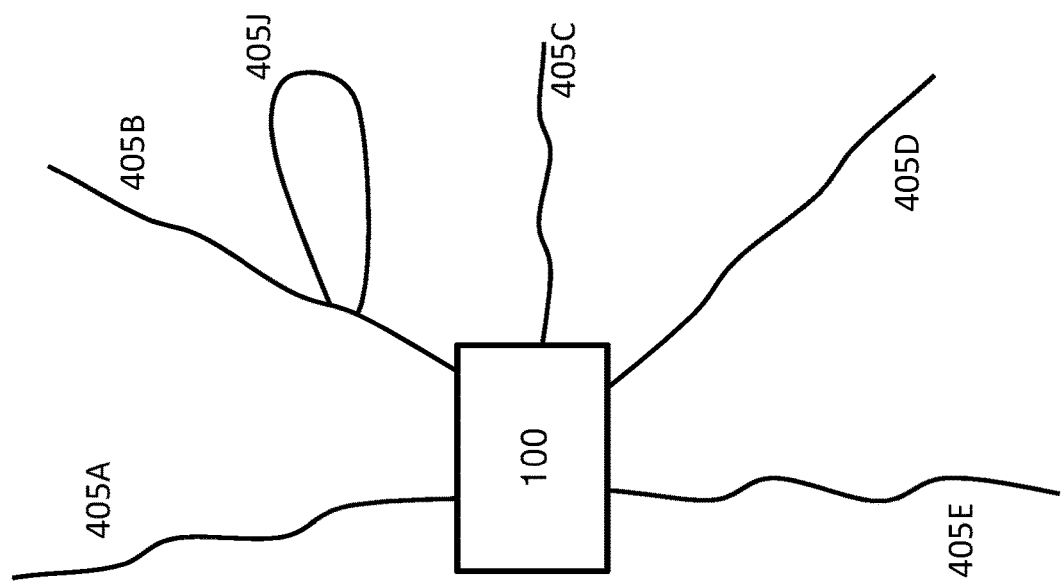
FIG. 4A illustrates a schematic distribution geometry of optical fibres utilised for obtaining digital data.

In one arrangement, as illustrated in FIG. 4A, the distribution includes optical fibres (405A to 405E) fanning out from one or more centralised locations (e.g. at a data centre 100 having a switch (not shown) to time-multiplex interrogating pulses into the optical fibres (405A to 405E)). Each fanned out optical fibre can extend into two or more optical fibres to increase spatial resolution as the optical fibres fan further out. Alternatively or additionally, as illustrated in FIG. 4B, the optical fibres (405F to 405H) can be installed with zig-zag patterns to provide spatial resolution with fewer but longer optical fibres. In general, the disclosed system and method is expected to achieve about 10 metre resolution or better. This can be achieved by virtue of an existing fibre infrastructure covering most major roads in a city in a first deployment step. As a second step fibre will be deployed at a more granular level over most streets and roads in a city so as to achieve comprehensive coverage in the form of a 2D grid, again with acoustic channels every 10 m on every street and road. In many cases this would not be necessary thanks to the density and ubiquity of installed fibre infrastructure, which would typically be in the form of an existing public telecommunications network. This will in most cases include fibre that extends across most if not all public thoroughfares, including road and rail networks.

The applicant is aware for example that there is dark fibre on all the existing main and even subsidiary roads in Sydney, Australia. The applicant is also aware that a large fraction of the streets also have fibre with the roll out of the Australian NBN and other existing FTTH FTTN deployments. These can be usefully deployed in the present embodiment.

In one arrangement, the optical fibres may include those installed underground, in which case the coverage of the geographical area includes the street level of a city, which is useful in monitoring vehicle and pedestrian traffic. Alternatively or additionally, the optical fibres may be installed within a multi-storey building (e.g. an office building or a shopping mall), in which case the alternative or additional coverage of the geographical area is the multiple floors of the building, which is useful in monitoring staff or shopper movements.

Aerial optical fibres may also be deployed like power lines or across harbours or other bodies of water. In addition or alternatively submarine fibres may be used for shipping, marine life, or environmental monitoring and the like. A dedicated fibre section may be spliced in to the existing optical fibre network on which the network is already deployed—eg a dedicated optical fibre cable could be routed around the Australia's Sydney harbour bridge at points of interest and then the two ends of the section of dedicated fibre is spliced in to the existing optical fibre network as is shown schematically at 405J for convenient remote access by a node located at for example a remote data centre. The system 100 may include a communications interface 117 (e.g. wireless or wired) to receive a search request from one or more remote mobile or fixed terminals 117A, 117B and 117C. Upon receiving a search request, the processing unit 114 may be configured to determine the requested information based on the stored electronic data, including those stored in the volatile and/or non-volatile memory. The requested information is on one or more of: (a) one or more of the multiple targets (i.e. the "what" or "who"), (b) one or more of the multiple instants (i.e. the "when"), and (c) one or more of the approximate locations (the "where"). Where the search request relates to specific targets (e.g. particular pedestrians in a suburb), the determined information for return may include where and when each of them is/was, based on the stored electronic data. Where the search request relates to specific times (e.g. between 5 am and 9 am on Jan. 1, 2016), the determined information for return may include what targets and where they are/were. Where the requested information relates to specific locations (e.g. locations surrounding a crime scene), the determined information for return may include what and/or who were nearby the crime scene and when they were there. A skilled person would appreciate that the requested information may be on a combination of "what", "who", "when" and "where". Some non-limiting examples are provided below.

In the case where the geographical area includes the street level of a city, a search request may be for the number of vehicles between 5 am and 9 am within a particular area spanning 10 blocks by 10 blocks, corresponding to an intersecting grid of optical fibres. In this case, the requested information may be determined by the processing unit 114 by retrieving the electronic data recorded at the multiple instants between 5 am and 9 am associated with detected acoustic disturbance signals at fibre distances corresponding to the approximate locations in the particular area. The retrieved electronic data may be processed to generate acoustic disturbance signals.

The FIR or other correlation filter types generate a digital detection event of a sound object (in the same way that an analog signal is converted into a digital representation of 1 and 0's depending on the signal amplitude at the sample time. The system generates digital symbols from processed acoustic signals that represent objects (with properties) in cities such as cars, pedestrians, trucks, excavators and events such as car crashes, gun shots, explosions, etc). This may be incorporated on a GIS overlay, with digital symbols overlaid on the map, as is clear from FIG. 5B, which includes pedestrian and car symbols.

Once the system has a digital record of these symbols it is possible to put together a very efficient index (in terms of time to search it and in terms of data size to hold the real time and historical indices) of object symbols that can be searched in the same way that any data base is presently searched on a computer. This search function will operate at the level of symbols, ie. will not use raw acoustic information in standard operation other than circumstances where a higher fidelity of symbols may be required (for example—one symbol index may just be made up of cars and trucks in a given city and what is subsequently required is a further 3 different categories of trucks (ie 18 wheelers, medium trucks, light trucks) and cars (Large, medium and small) in which case some re-processing may be required of the raw acoustic information (with more specifically tuned correlation filters) to generate the higher fidelity symbol index, in cases where an additional higher fidelity index has not yet been generated for the particular geographic area and time.

Figure 2A:
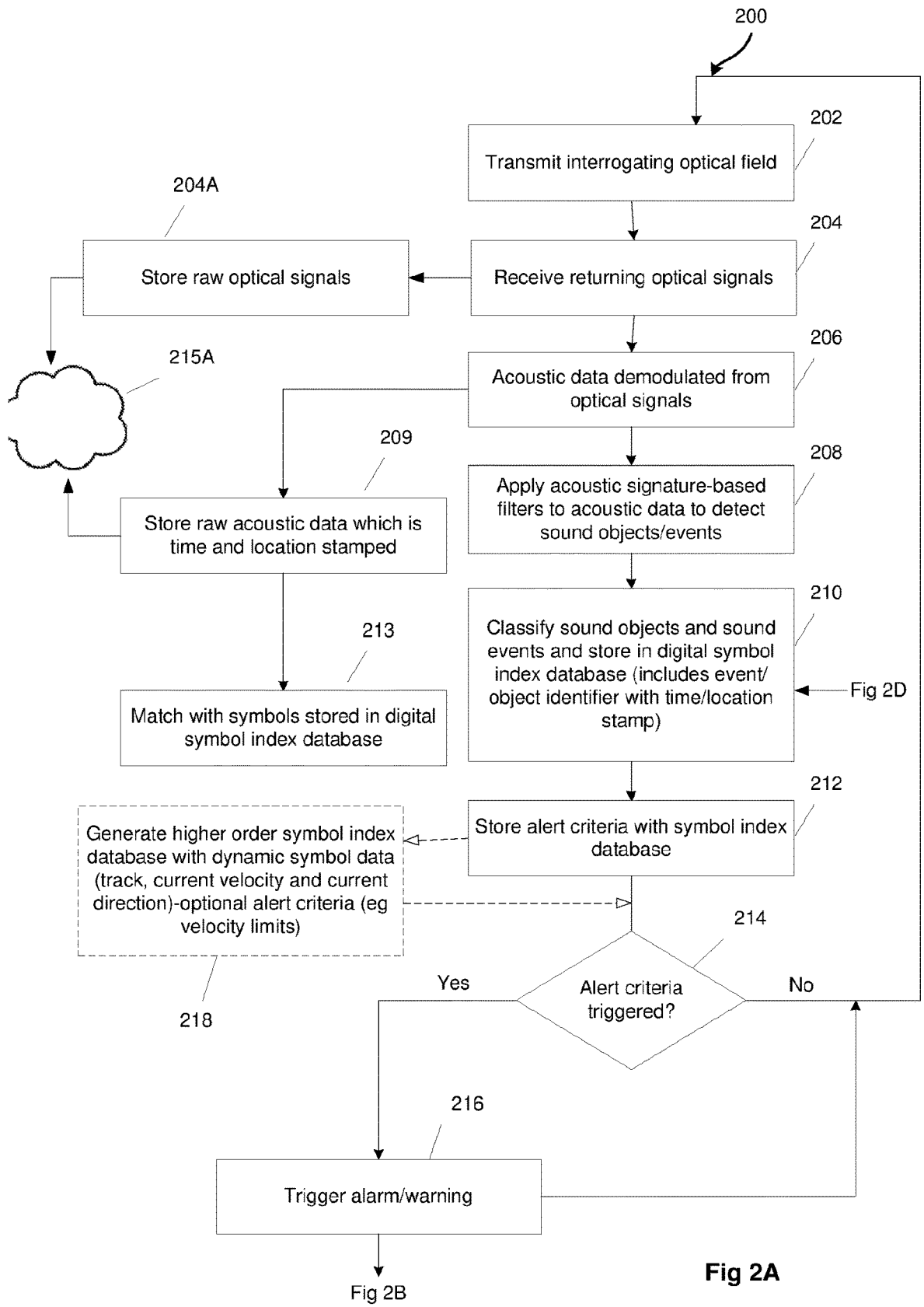
FIGS. 2A, 2B, 2C, 2D and 2E illustrate examples of methods of providing and processing digital data.
Figure 2B:
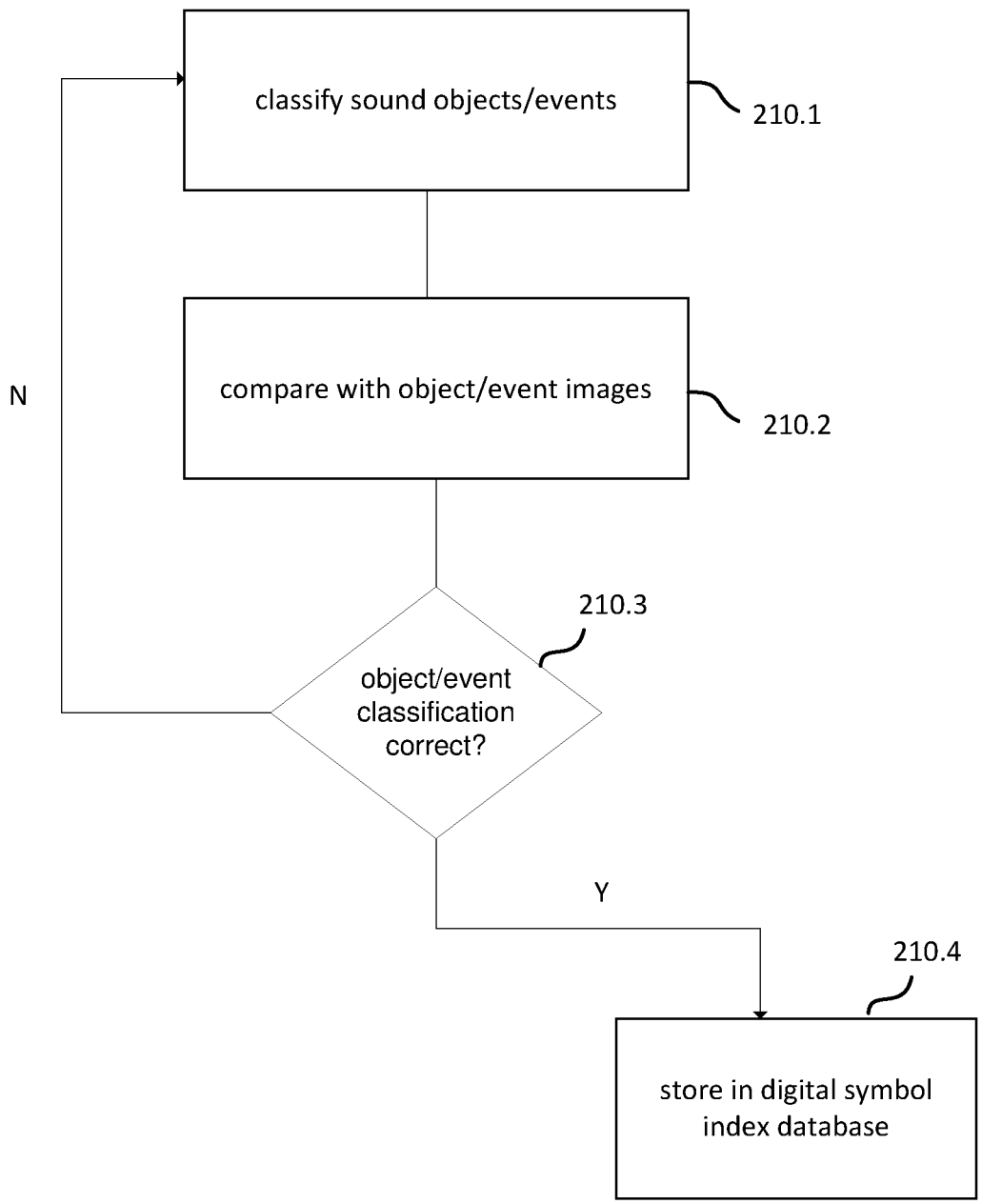
Figure 2C:
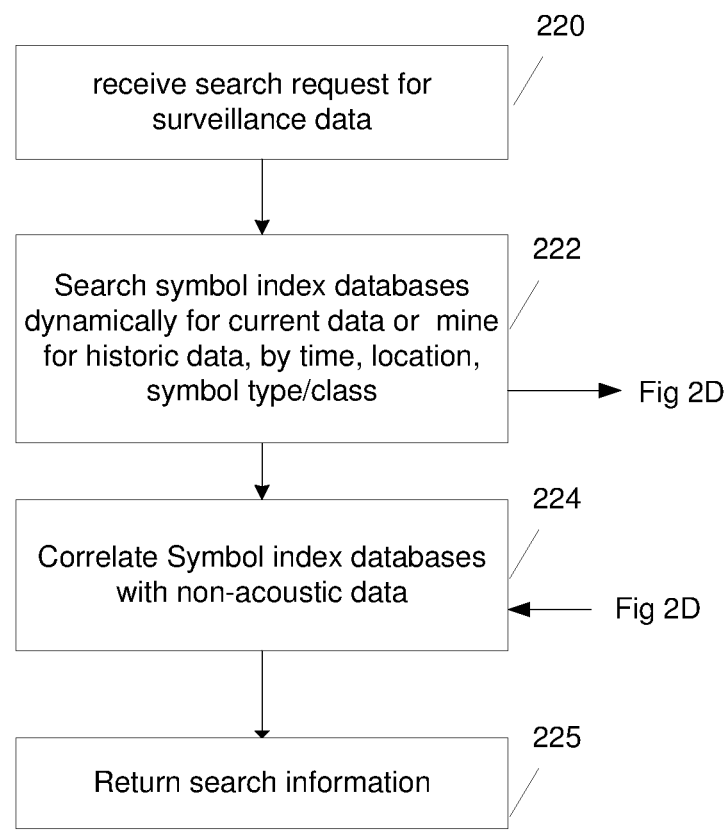

FIG. 2C shows the steps involved in receiving the search request at 220, searching the symbol index databases at 222 and at 224 correlating the symbol index databases with non-acoustic data, returning search information 225 so as to provide an enriched dataset.

Figure 2D:
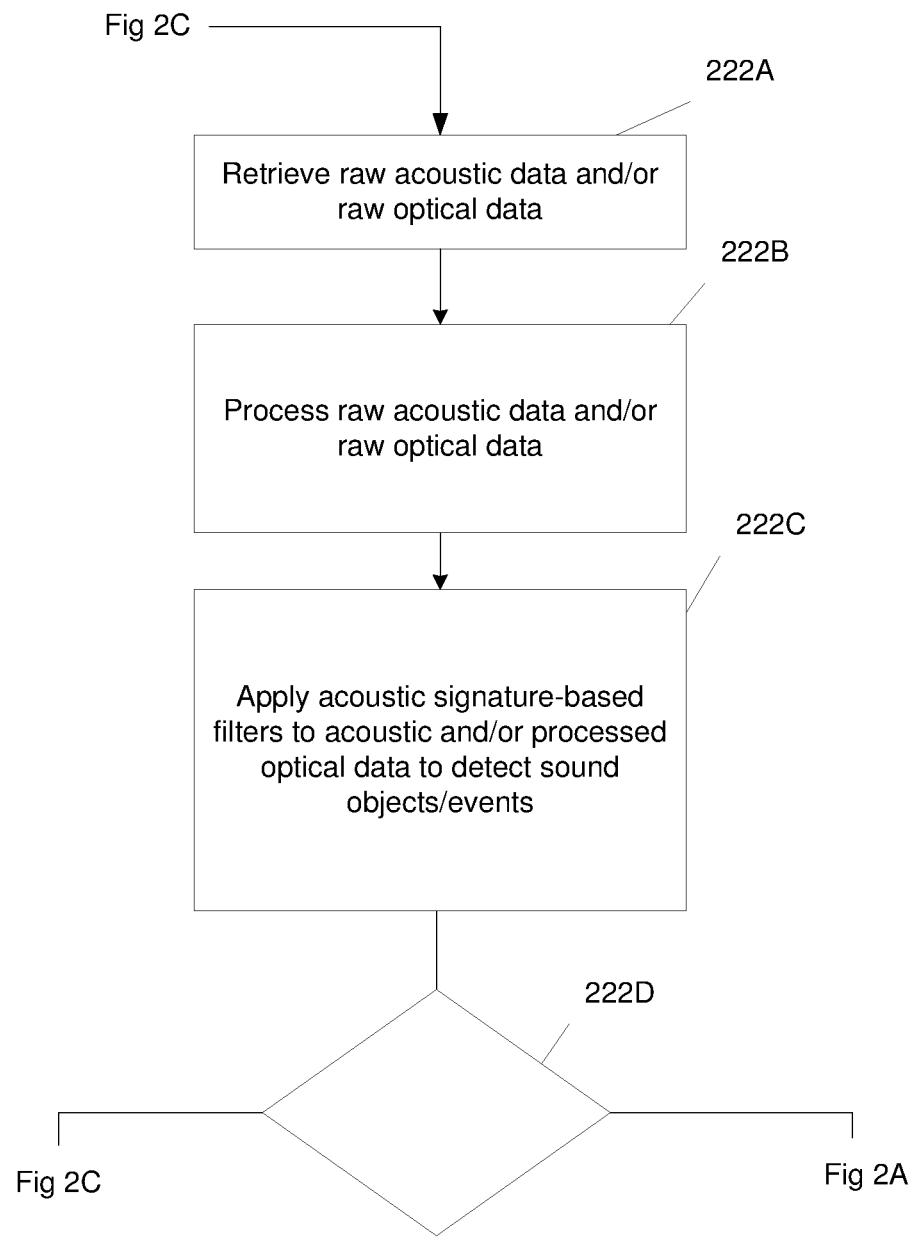

FIG. 2D shows the additional retrieval steps involved in mining historic data at 222 by retrieving raw acoustic and/or optical data from the cloud 215A at step 222A, processing the raw acoustic/optical data at step 222B, which in the case of the optical data would include demodulating it at the optimum sampling frequency, and at step 222C applying acoustic signature-based filters to the acoustic and/or processed optical data to detect historic sound objects or events. At step 222D the process reverts to step 224 of FIG. 2C or alternatively or subsequently to step 210 of FIG. 2A.

With the grid of fibre paths and substantially overlapping sensing range described in this disclosure, multiple phased array beams may be formed with subsets of sensor channels from the total sensor array formed over the length of optical fibre interrogates. This plurality of beams may have different spatial positions (ie. which subset of sensors from the total sensor array are selected corresponding to a different geographical location in the system), angular orientation (which angle or angles relative to the local length axis of the fiber) and/or directivity (aspect ratio of the sensing beams—ie. how sharp or obtuse are the beam spatial shapes) properties around the system to achieve higher level sensing functions in the system that include long range detection, localisation, classification and tracking of acoustic sources in a 2D or 3D coordinate system.

Figure 2E:
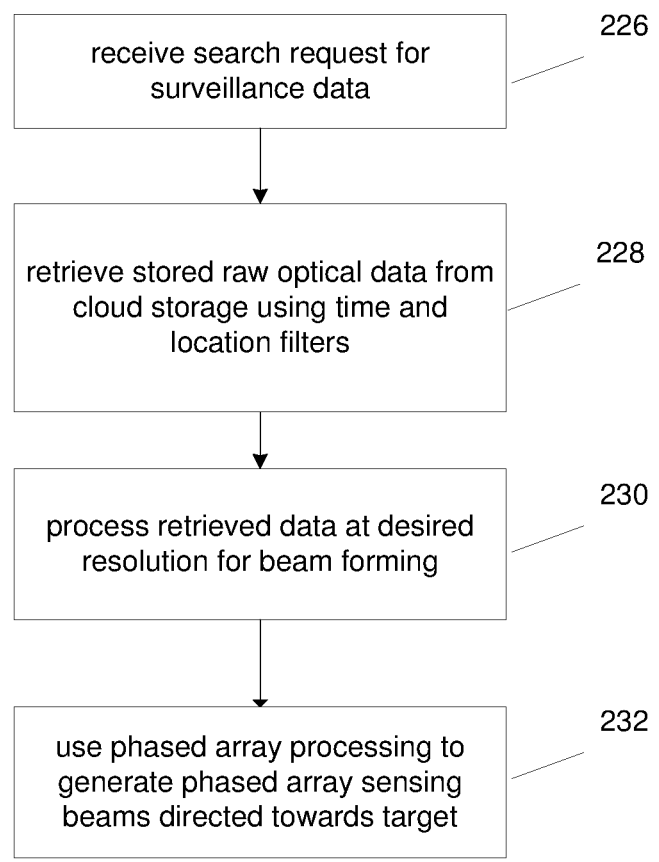
Figure 8:
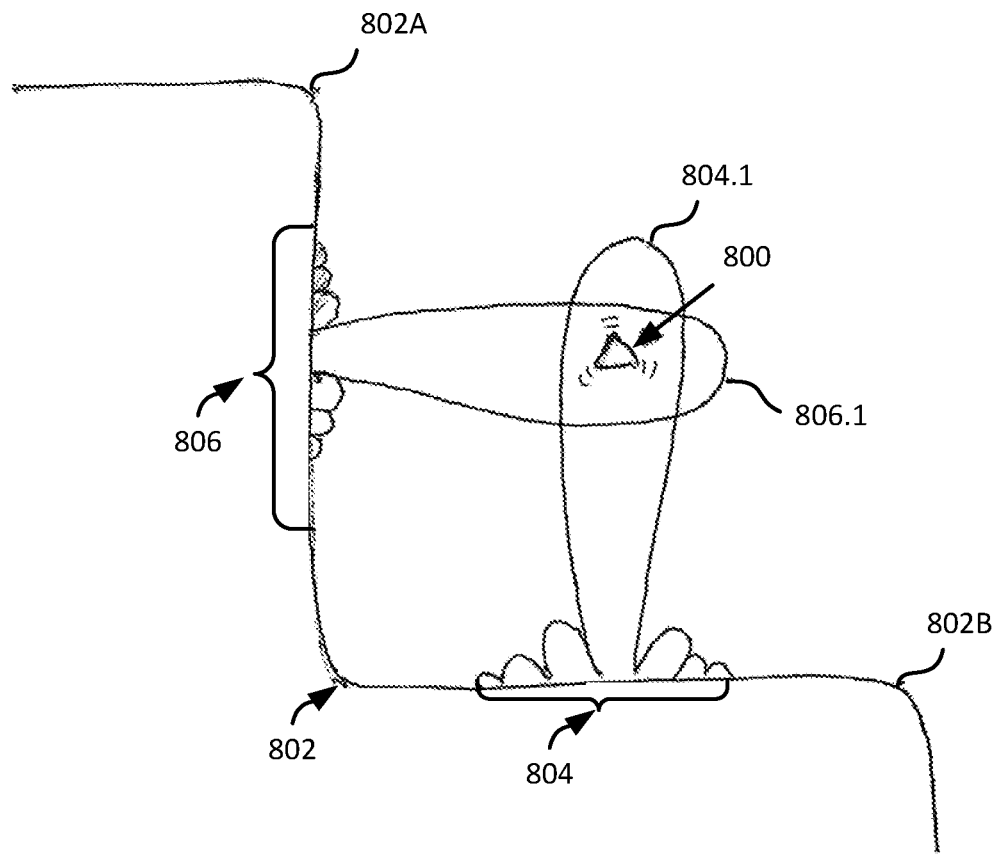
FIG. 8 shows a partly schematic diagram of a fibre optic cable with phased array sensing beams.

By way of example, FIGS. 2E and 8 illustrate how a stored optical data may be effectively used to generate phased array sensing beams to locate a target/sound source 800 which is spaced from a fibre optic cable 802.

At step 226 a search request is received for surveillance data. This could be based on a previous incident identified through internal acoustic (via a symbol index for example) or external non-acoustic detection means or could alternatively be based on a need to monitor a particular area. At step 228 stored raw optical data is retrieved from cloud storage using time and location filters. The retrieved data is then processed at a desired resolution for beam forming, as is shown at 230. In the particular example the an acoustic time series could be generated between points 802A and 802B with a resolution of 1 m, which would allow for generation of phased arrays at 804 and 806 and consequent generation of phased array sensing beams having major lobes 804.1 and 806.1 which overlap to detect the location of the acoustic source 800, as is shown at step 232. The beams may be tuned by the phased array to scan the area around the target, in both 2D and 3D.

In this way relevant segments of the stored optical data may be extracted and processed in a targeted way, covering areas of interest or those requiring additional coverage by virtue of their location away from the installed fibre optic cable.

In another case, a search request may be used to determine where bus passengers alighting from a particular bus arriving 8:05:55 am on a particular day at a particular bus interchange walk to. In this case, the requested information may be determined by the processing unit 114 retrieving the electronic data recorded at the multiple instants from 8:05:55 am onwards and continued for 30 minutes and associated with detected acoustic disturbance signals detected at fibre distances corresponding to a 1 km radius from the bus interchange. The electronic data could be raw data but would preferably be in this case the symbol indices associated with pedestrian activity at the relevant time and location.

A fairly broad pedestrian detection filter may be applied to efficiently locate all pedestrians within an area and then a much more specific set of filters could be applied to classify foot wear type (sole type—rubber, leather, metal), gait of walk by ratio'ing number of steps for given distance along a path to estimate height of person, speed of walk, estimated weight of person from low frequency pressure amplitudes generated by footsteps on pavement. As previously noted these filters are generally initially applied to the acoustic data at the time of collection, so as to enable the storage of symbols representative of object and activity type, though for higher resolution raw acoustic or optical data may be retrieved and reprocessed.

Tracking algorithms, once initiated on objects that move fairly consistently (ie pedestrians and road vehicles for example, as opposed say to excavators which do not move consistently or predictably) look at where particular footsteps are detected and any history of them and set location and velocity filters to follow a track by assuming their walking speed is going to remain relatively consistent. These tracking algorithms allow the system to build up a more comprehensive set of properties for an object by following (accumulating a longer time series and bigger data set) the object across a number of stationary but virtual acoustic channels. For example, a tracker set on a car can build up a continuous speed profile of the vehicle over many kilometres (across hundreds of individual acoustic channels in the system), it can also apply more comprehensive frequency and time domain analysis to determine what elemental sound objects are present within the overall object, for example with a car, there are included sound objects such as tyres on the road, a rotating combustion engine, a transmission system, brakes, stereos, horns, and cooling fans. If the sound data coming from the engine is isolated this could be further analysed this for features like number of cylinders from the firing sequence (straight 4, straight 6, V6, V8, V10, V12—all of which have a distinctive sound sequence, with the exhaust note in addition being distinctive across the engine model).

In yet another case, a search request may be to identify any foot traffic or vehicle movements nearby a jewelry shop that has had an overnight theft at an unknown time during non-opening hours. In this case, the requested information may be determined by the processing unit 114 retrieving the electronic data recorded after the shop closed the previous night and before the shop opened the next day at a fixed radius (e.g. 5-10 km) from the shop.

The electronic data could be raw data but would preferably in this case be the symbol indices associated with pedestrian activity at the relevant time and location. In the case of raw data, to accentuate the presence of acoustic disturbances in the signals relating to pedestrian traffic (such as those caused by footsteps going into and leaving the shop) a particular FIR filter may be used to enhance the frequency components associated with footsteps (e.g. 2-10 Hz), initially focussing only at the shop location. The processing unit 114 is then configured to track any footsteps leaving the shops to where the footsteps end. This could also be achieved by searching the pedestrian symbol index for the time and location from which pedestrian tracking information could be generated. To anticipate the possibility of the thief getting away in a vehicle, the processing unit 114 may be configured to then track any subsequent vehicle movements originating from where those footsteps are tracked to, or by searching the vehicle symbol index and correlating this with the pedestrian index to identify potential crossover locations where pedestrian activity morphed to vehicle activity, from where one of more particular vehicles may be tracked to a termination point. The determined location may form a lead, such as where the stolen goods and the thief might have been or may still be, for law enforcement personnel to further investigate.

In another arrangement, the step of processing signals representing the acoustic disturbance in to symbols may be based on artificial intelligence and machine learning. In this case AI has the ability to discern a far greater number of distinct sound objects (ie car detections in symbols that represent distinct make and model) as well as the ability to pull out sound objects from very faint acoustic signatures amongst high noise backgrounds. This will expand the range over which the fibre optic cable can hear certain object classes and sub-classes and increase the detection rates of all objects around the cable. It will also decrease the false alarm rates as many more logic parameters can be brought to bear before making a sound object detection and classification decision. AI is accordingly applicable in particular to expanding the symbol set that can be detected for sound objects on roads, for example, where multiple vehicle classes and sub-classes are present.

A key part of the machine learning and AI function is a mechanism to record an acoustic signature associated with a particular sound object classification and have a feedback mechanism for the system to 1) link a symbol/object type (ie. make and model of a car) with that sound signature detection. This could be done manually with an operator looking at a video monitor of a given road way or with machine vision applied to a singular or otherwise small number of locations on a road way. An iterative training sequence may also be employed where the detection and classification of objects is fed back as correct or incorrect based on other means of detecting the objects (ie video and machine vision). This feedback is key to developing high fidelity discernment and low false alarms, and could be implanted in a live in situ environment with for example the operation of a CCTV camera/video monitor in conjunction with DAS to record and identify sound objects and events. FIG. 2B shows how step 210 in FIG. 2A can include a number of training sub-steps in which sound objects and events that have been classified at 210.1 are compared with object/event images at 210.2. At 210.3 if the comparison is correct the resultant correctly classified symbol is stored in the digital symbol index database at 210.4. If not the classification process is repeated until the image of the object/event and the sound image/event match.

FIG. 1 shows how an existing CCTV network represented by cameras 118A, 118B and 118C linked to a monitoring centre 119 may be used in the training steps above, with the digital video data or at least the video classification data being transmitted back to the processing unit 114.

Figures 5A, 5B:
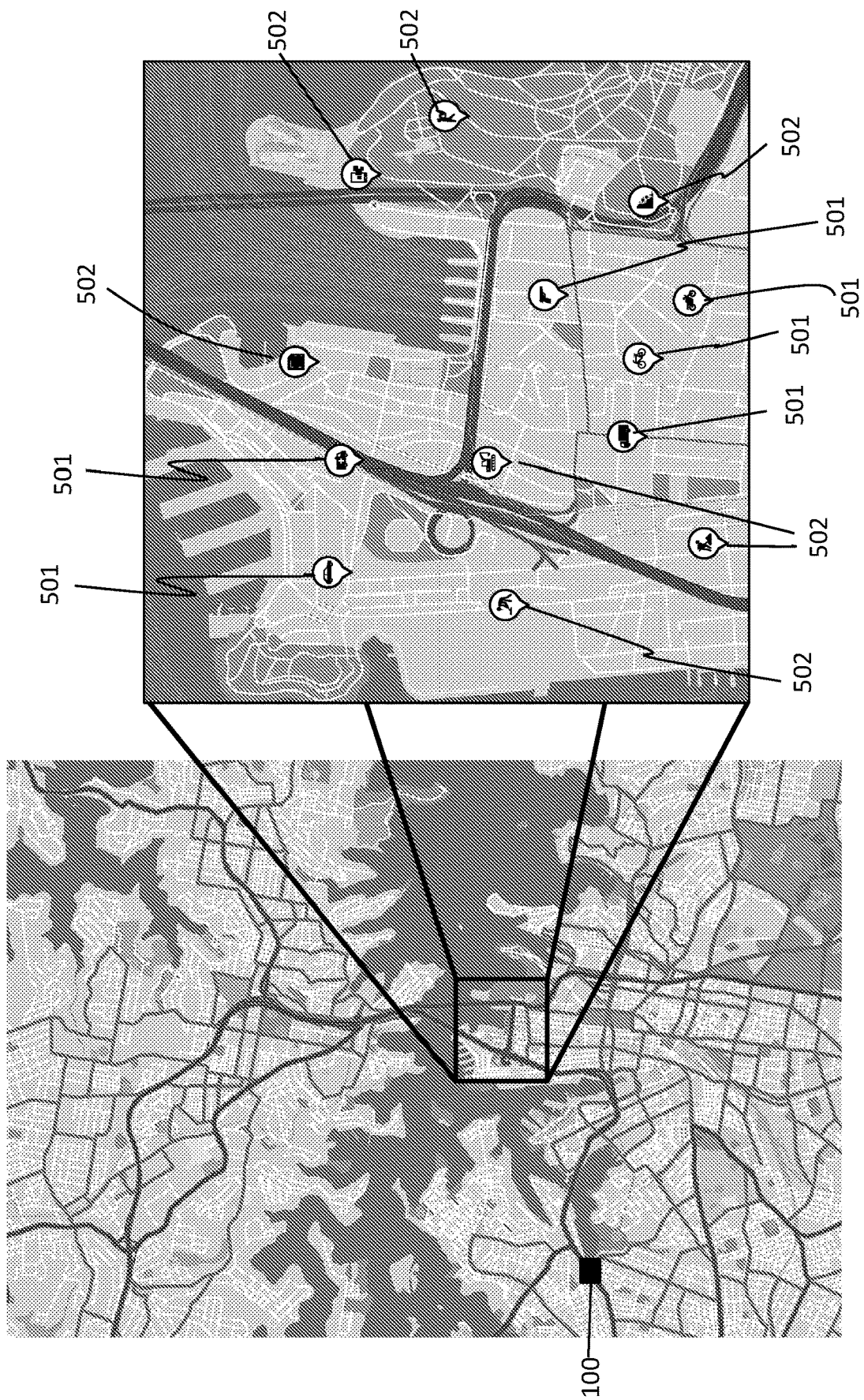
FIGS. 5A and 5B illustrate distribution geometry with a Google® maps overlay of part of Sydney and typical graphic representations of symbols.

FIGS. 5A and 5B illustrate distribution geometry of the acoustic system in with a Google® maps GIS overlay of part of Sydney. A fibre optic network comprises the existing fibre optic network which extends across the Sydney area, from data centre 100. As described above, the network extends across main, arterial roads indicated in dark outline and other roads indicated in light outline, to obtain widespread coverage of the city area.

FIG. 5B shows typical graphical representations of a typical monitor at any moment in time including representations of sound object symbols 501 and activity-based symbols 502, which are self-explanatory. The symbols may be moving or stationary.

Referring now to FIG. 6, a typical subscriber interface 600 is shown which allows subscribers to select location and symbol parameters for of interest to them for monitoring purposes. For example the locations of Ivy St, Hyde Park and Herbert St have been selected for personnel and vehicle detection, and the Harbour Tunnel has been selected for Vehicle detection by turning on the relevant radio button icon. This selection may be by one or multiple subscribers, and it will be appreciated that many other activities and locations may be selected, as well as time periods as described above.

A skilled person would appreciate that, rather than storing and then retrieving the electronic data, the electronic data once ready to be stored can be used without retrieval for real-time monitoring as explained in the examples above. A search request associated with real-time monitoring may be to provide the number of walking pedestrians in real-time. In this case, the processing unit 114 may be configured to discern individual persons by footsteps and count the number of discernible people at short and regular intervals (e.g. every 5 seconds). Alternatively, a skilled person would also appreciate that, rather than storing electronic data relating to the raw acoustic disturbances for later retrieval, the disclosed method may store the processed acoustic disturbance signals for later retrieval. In this case, the requested surveillance data includes determining the requested surveillance data based on the processed acoustic disturbance signals.

Figure 7:
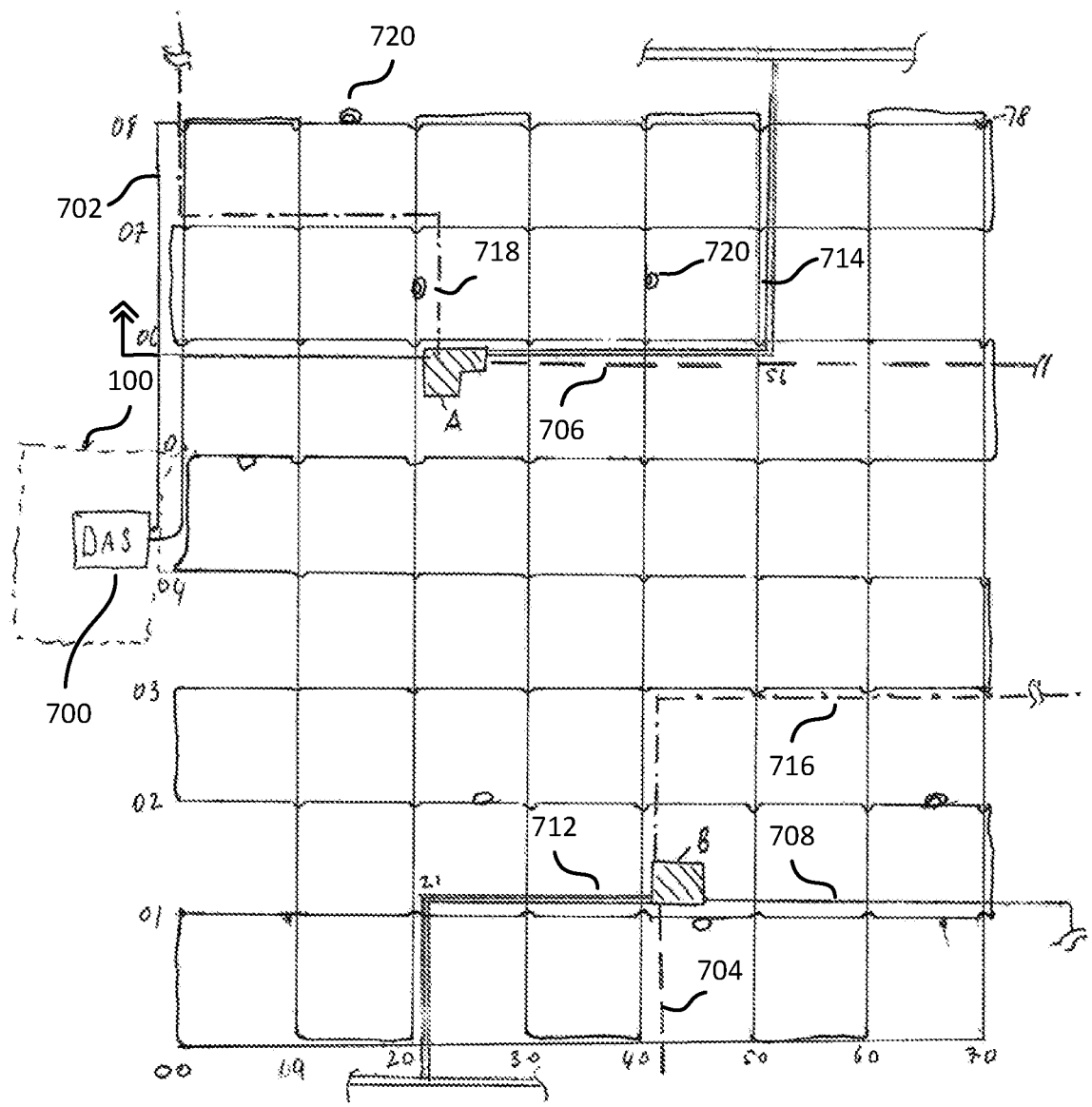
FIG. 7 illustrates a partly schematic distribution geometry showing how virtual paths are created from an established optical fibre network for servicing individual subscribers in a geographic area.

Referring now to FIG. 7 a distribution geometry shows how virtual paths may be created from an existing optical fibre network for servicing individual subscribers in a geographic area. Subscribers are associated with respective buildings A and B in an urban environment. The environment includes a data centre 100 including a DAS system 700 of the type described in FIG. 1. An existing fibre optic cable network in the form of a single fibre optic cable 702 extends from the DAS system 700 and covers an entire city centre. In the example the fibre runs first vertically and then horizontally in a serpentine fashion across a grid defined by a road network. It will be appreciated that in reality the grid will be far more irregular but that this is still a representation of the extent of coverage that can be provided by an existing fibre optic cable of this type in city centres such as Sydney and New York.

Each installation or building A and B has a critical infrastructure footprint that requires monitoring and protecting including telecoms lines 704 and 706, power lines 708 and 710, water mains 712 and 714, and gas lines 716 and 718. Each of these generally follows segments of the fibre optic cable. For example the water mains line of building B extends from co-ordinates 20 to 21 and 21 to 41, and telco line extends from co-ordinates 40 to 41. As a result, for each of the subscribers associated with buildings A and B, virtual sensing lines are created made up of selected segments of the fibre optic cable, and only these segments require monitoring for each subscriber. An advantage of using virtual paths crated from actual segments of an existing fibre optic cable is that numerous buildings can be simultaneously and monitored in both real time and using historic data for subscribers in an urban environment using an existing fibre optic network. It will be appreciated that the fibre optic network may be made up of a number of different fibre optic cables in which case segments from different cables may be "stitched" together to create a number of virtual dedicated sensing and monitoring networks for each of a number of entities in a typically urban environment where there is a high density of installed fibre optic cable.

This can be achieved in a number of ways. Once a determination is made of which fibre segments are of relevance for a particular subscriber, the geographic co-ordinates associated with the segments are stored and then correlated with the generated datasets so that they may be selectively monitored.

It is also possible to retrieve historic data which has been time and location stamped and to process this in the same manner. As was described with reference to FIG. 6 the subscriber could also select location, time and symbol parameters of interest.

As can be seen at 720, the fibre optic cable is typically formed with spools or loops to provide flexibility for splicing or repairs. Spatial calibration is accordingly required as an initial step so that there is correlation between the detected fluctuations in the cable to the geographic location of the cable. This process is described in more detail in the specification of International patent application PCT/AU2017/050985 filed on 8 Sep. 2017 in the name of the applicant entitled "Method and system for distributed acoustic sensing", the contents of which are incorporated in their entirety by reference. It will be appreciated from the specification that acoustic, spatial and physical calibration are generally required.

The presently disclosed system and method of distributed acoustic sensing may be used with phased array processing and beam forming techniques. As mentioned above, outgoing light 106 may be sent into the fibre-optic sensing cable 205 as a series of optical pulses. The reflected light 210 produced as a result of backscattering of the outgoing light 106 along the fibre-optic sensing cable 205 is recorded against time at the receiver 208. This configuration permits determination of an acoustic signal (amplitude, frequency and phase) at every distance along the fibre-optic sensing cable 205. In one embodiment, the receiver 208 records the arrival times of the pulses of reflected light 210 in order to determine the location and therefore the channel where the reflected light was generated along the fibre-optic sensing cable 205. This phased array processing may permit improved signal-to-noise ratios in order to obtain improved detection of an acoustic source, as well as the properties of the acoustic source.

Further, from the above examples, a skilled person would appreciate that, rather than storing or basing the determined data on the raw or processed optical or acoustic disturbance data, the method can classify the acoustic data into different types of acoustic data, in the form of symbols. The method can subsequently store and determine the requested data based on the classified acoustic data. The different types of acoustic data can each be associated with a corresponding target type. For example, the classification involves classifying targets based on the processed acoustic disturbance signals for storage as symbols and for later retrieval to form the basis of determining the requested data. In one arrangement, the processing unit 114 may be configured to classify acoustic disturbance signals into one of more target types.

Classification may involve applying a corresponding FIR filter for each target type. For example, classification includes applying an FIR filter to detect tyre noise to facilitate classifying acoustic disturbance signals as a moving vehicle. Another FIR filter may be used to distinguish between a car and a truck. As another example, classification includes applying a FIR filter to detect footsteps to facilitate classifying acoustic disturbance signals as a walking pedestrian. As yet another example, classification includes applying a FIR filter to detect rail track noise to facilitate classifying acoustic disturbance signals as a moving train. Each classified target may then be pre-tracked, before a search request is received, by processing unit 114 and stored in storage means 115 or 115A for later retrieval.

In one arrangement, the electronic data may be datamined in real time to generate alerts (such as real-time alerts or daily alerts) of requested information based on a search request.

It should be apparent to the skilled person in the art that the described arrangements have the following advantages compared to non-acoustic sensing:

Compared to a static image capturing system (e.g. street views captured by moving cameras), the disclosed arrangements can be used for real-time monitoring as well as for searching for past events and at multiple instants in the past.

Compared to sensors on a large number of mobile devices (e.g. means which depends on presence and operation of user devices, which are not tied to a particular object), the disclosed arrangements rely on fibre-optic infrastructure which is relatively static and reliable, and which can be used to reliably classify objects and events).

Compared to lower coverage and significantly more expensive camera techniques, (e.g. CCTV-based surveillance camera having a depth of view of tens to hundreds of metres), the disclosed arrangements requires a single optical fibre to gather surveillance with a reach of tens of kilometres (up to at least 50 km and 1,000's of individual acoustic channels), limited primarily by the attenuation of optical signals.

Compared to LIDAR (e.g. using a series of LIDAR sensor heads across a city), the disclosed arrangements can monitor places where visual obstruction (e.g. underground, within a building or under bridges or flyovers) is present.

Compared to satellite imagery surveillance means which provide a birds-eye view from space, the disclosed arrangement is largely weather-independent and can monitor places where visual obstruction (e.g. underground, under thick clouds, within a building or under bridges or flyovers) is present, as well as providing live and dynamic as opposed to static data.

While image-based data has a higher resolution than acoustic data, the lower resolution of acoustic data has considerable advantages in terms of bandwidth and storage requirements, especially in the context of monitoring in real time a large urban geographic area While the above non-acoustic sensing systems individually have their respective shortcomings, the present disclosure may be effectively combined with one or more of the above non-acoustic sensing systems to achieve an optimum outcome which includes higher resolution where necessary. Surveillance or monitoring data obtained from a non-acoustic sensing system may be represented together with the requested data obtained by the disclosed method and system. For instance, in the example of tracking the foot traffic of bus riders alighting at a bus interchange, the locations of individuals over time may be overlaid with an aerial map captured by satellite imagery. The combined representation may provide for more informed visualisation of how dispersed the particular group of bus riders are and, for example, adjustments to locations of bus stops may be correspondingly made. In another instance, in the example of tracking the potential jewelry thief, the tracked pedestrian path and the tracked vehicle path may be represented in the static street views obtained from the moving image capturing system. The combined representation may provide for more informed visualisation, such as providing visual cues to law enforcement personnel as to whether the potential jewelry thief would have walked or driven past locations of interest (e.g. a 24-hour convenience store where staff may be able to provide relevant information about the incident when interviewed).

When combining an acoustic sensing system with at least one non-acoustic sensing system, surveillance data may be obtained independently by the two systems to address shortcomings of each other or make surveillance information more granular than otherwise obtainable by either system alone. Based on the surveillance data obtained by one system, the other system may be requested to provide more specific surveillance information. In one arrangement, the surveillance information obtained from the non-acoustic sensing system is based on the requested information determined by the acoustic sensing system. For example, the acoustic sensing system provides requested data that two cars approaching an intersection collided at a specific instant (but not information regarding which driver is at fault), the CCTV surveillance system 118 and 119 may be used in conjunction to provide any footage capturing either set of the traffic lights presented to the corresponding driver (but not capturing the moment of the collision), at the time of the collision determined by the acoustic sensing system. By matching the times at which the surveillance information is obtained, the combined system may be used to determine the at-fault driver. There are many other examples where the visual and acoustic data may in combination provide valuable corroborating forensic and evidentiary information for legal and other purposes.

In another arrangement, the search request is addressed by delivering an interactive 3D virtual representation of a particular location similar to the 3D virtual presentation that is generated by the Street View function of Google Maps. In the arrangement described here, this would look like Google Maps Street View with a projection of real time moving symbols (particular sound objects) overlaid in the 3D interactive display where one can pan and tilt and move through the 3D view. This emulation could also include stereo sound for a sense of direction of real time sound the user is hearing. For example a search request could result in a user being able to view a particular street location with an computer generated visual emulation of all moving objects detected by the system augmented by the actual sound recorded by the system. Such a capability could assist a user in achieving rapid and comprehensive situational awareness of an area that would be an effective information tool for example for emergency response and law enforcement personnel.

The 3D virtual representation could also be a more comprehensive digital emulation/simulation of both the static objects (e.g. buildings, infrastructure, roads, foot paths, bridges) and the real time moving objects detected and classified in this disclosure (cars, trucks, pedestrians, bicycles, excavators, animals, as well as sub-classes of these objects, where feasible). This would allow a much more interactive immersion experience where an individual could move anywhere in the virtual environment, for example through doors, and see real time moving objects (e.g. pedestrians and traffic) and also hear directional sounds (via stereo channels) in the virtual environment at that location. An example of a more comprehensive digital emulation or simulation is the 3D building function of Google Earth in city centres where it is possible to overlay a digital emulation of all large buildings in 3D on the satellite imagery for a photo-realistic 3D image of a city.

In another arrangement, the search request is based on the surveillance information obtained from the at least one non-acoustic sensing system. For example, a satellite imagery system provides surveillance information that a person has entered a multi-level and multi-room building to undertake suspected criminal activities (but not surveillance information inside the building). Where an acoustic sensing system is in place within the building, a search request for tracking footsteps at a particular time from a particular building entry may be able to determine which level and which room the person is located. The determined information may allow law enforcement personnel to take corresponding action, such as sending enforcement personnel to the particular level and particular room.

In yet another arrangement the acoustic sensing and monitoring system is effectively combined with an existing mobile phone network in an urban environment where the mobile phone is GPS-enabled and uses Google Earth or a similar mapping and tracking application. An acoustic sensing app is provided which allows the user, in this case a pedestrian, to search for symbols of interest, or receive alerts of interest. For example an alert could be generated in the event of a car in the vicinity being driven dangerously or erratically. In another application a pedestrian could be alerted to areas where there are high incidences of shootings or collisions based on the retrieval and overlay of historic data generated by the acoustic sensing network.

It will be understood that the invention disclosed and defined in this specification extends to all alternative combinations of two or more of the individual features mentioned or evident from the text, examples or drawings. For example, any one or combination of the "what", "when", "where" and "who" may form the basis of the search request. Similarly, any one or combination of the "what", "when", "where" and "who" may form the basis of the determined information. All of these different combinations constitute various alternatives of the present disclosure.

The invention claimed is:

1. An acoustic method of providing spatial and temporal classification of a range of different types of sound producing targets in a geographical area, the method including the steps of:
   repeatedly transmitting, at multiple instants, interrogating optical signals into one or more of a plurality of optical fibres distributed across the geographical area and forming at least part of an installed fibre-optic communications network, wherein the installed fibre-optic communications network includes the plurality of optical fibres, and segments of the one or more of the plurality of optical fibres create a plurality of virtual dedicated sensing networks;
   receiving, during an observation period following each of the multiple instants, returning optical signals scattered in a distributed manner over distance along the one or more of the plurality of optical fibres, the scattering influenced by acoustic disturbances caused by the multiple targets within the observation period;
   demodulating acoustic data from the optical signals;
   processing the acoustic data and classifying the processed acoustic data in accordance with target classes or types to generate a plurality of datasets including classification, temporal and location-related data;
   storing the datasets in parallel with raw acoustic data which is time and location stamped so that it can be retrieved for further processing and matched with the corresponding datasets to provide both real time and historic data; and
   monitoring a plurality of different footprints in the geographic area, each footprint comprising at least one virtual dedicated sensing network.

2. The method of claim 1, wherein the acoustic data is classified by correlating it with acoustic signatures associated with each of the target classes or types, wherein the method includes generating the acoustic signatures of a number of sound producing targets.

3. The method of claim 2, further comprising the step of classifying the sound producing targets as symbols representative of the sound producing targets and storing the symbols as part of the datasets in a digital symbol index.

4. The method of claim 2, further comprising:
   generating a higher order symbol index database including dynamic symbol data associated with velocity and direction, and with alert criteria.

5. The method of claim 2, further comprising:
   generating alert criteria associated with the respective acoustic signatures, and triggering an alarm or warning in the event of the alert criteria being triggered, wherein the alert criteria are generated using a semantics engine to assess a threat or alert level associated with a target, and the alarm is triggered in the event of the threat or alert level exceeding a threshold.

6. The method of claim 1, further comprising:
   receiving a search request directed towards one or more of the classification, temporal or location-related data, and using the data in conjunction with a GIS overlay, including representing target classes or types as symbols.

7. The method of claim 1, wherein the one or more optical fibres include one or more unlit optical fibres or unused spectral channels in the installed urban or metropolitan fibre-optic communications network, and the fibre-optic communications network is a high density public telecommunications network.

8. The method of claim 1, further including processing or representing the datasets together with surveillance data obtained from at least one non-acoustic sensing system.

9. The method of claim 1, further comprising storing raw optical data in parallel for subsequent retrieval and processing.

10. The method of claim 9, wherein beam forming techniques are used on at least one of the retrieved and processed raw optical data and the demodulated acoustic data.

11. The method of claim 1, further comprising:
    obtaining at least location related data associated with each footprint and processing this data with that of the generated datasets to provide dedicated datasets associated with each footprint, the location related data corresponding to the virtual dedicated sensing network.

12. The method of claim 11, wherein the entity or subscriber has at least one premises in the geographic area and the virtual dedicated sensing network coincides with critical infrastructure around the premises requiring monitoring and protection including at least one of power lines, water mains, telecommunications lines and gas mains.

13. An acoustic method of providing spatial and temporal classification of a range of different types of sound producing targets in a geographical area, the method including the steps of:
    repeatedly transmitting, at multiple instants, interrogating optical signals into one or more of a plurality of optical fibres distributed across the geographical area and forming at least part of an installed fibre-optic communications network, wherein the installed fibre-optic communications network includes the plurality of optical fibres, and segments of the one or more of the plurality of optical fibres create a plurality of virtual dedicated sensing networks;
    receiving, during an observation period following each of the multiple instants, returning optical signals scattered in a distributed manner over distance along the one or more of the plurality of optical fibres, the scattering influenced by acoustic disturbances caused by the multiple targets within the observation period;
    converting the optical signals to optical data, and storing the optical data, the optical data including temporal and location related data;
    receiving a search request including temporal and location related filters or parameters, and retrieving the optical data based on said parameters;
    processing the optical data into acoustic data; and monitoring a plurality of different footprints in the geographic area, each footprint comprising at least one virtual dedicated sensing network.

14. The method of claim 13, further comprising:
processing the acoustic data and classifying it in accordance with the target classes or types to generate a plurality of datasets including classification, temporal and location-related data, and storing the datasets.

15. The method of claim 13, wherein the optical data is processed into acoustic data at a resolution based on the temporal and location based parameters, the processing including retrieving the acoustic data at a desired resolution for beam forming at a desired location.

16. An acoustic system for providing spatial and temporal classification of a range of different types of sound producing targets in a geographical area, the system including:
an optical signal transmitter arrangement for repeatedly transmitting, at multiple instants, interrogating optical signals into one or more of a plurality of optical fibres distributed across the geographical area and forming at least part of an installed fibre-optic communications network, wherein the installed fibre-optic communications network includes the plurality of optical fibres, and segments of the one or more of plurality of the optical fibres create a plurality of virtual dedicated sensing networks;
an optical signal detector arrangement for receiving, during an observation period following each of the multiple instants, returning optical signals scattered in a distributed manner over distance along the one or more of the plurality of optical fibres, the scattering influenced by acoustic disturbances caused by the multiple targets within the observation period;
a processing unit for demodulating acoustic data from the optical signals, processing the acoustic data, and classifying the acoustic data in accordance with the target classes or types to generate a plurality of datasets including classification, temporal and location-related data;
a storage unit for storing the datasets in parallel with raw acoustic data which is time and location stamped so that it can be retrieved for further processing and matched with the corresponding datasets to provide both real time and historic data; and
wherein the processing unit is configured to monitor a plurality of different footprints in the geographic area, each footprint comprising at least one virtual dedicated sensing network.

17. The system of claim 16, wherein the processing unit is configured to obtain at least location related data associated with each footprint and process this data with that of the generated datasets to provide dedicated datasets associated with each footprint, the location related data corresponding to the virtual dedicated sensing network.

18. An acoustic system for providing spatial and temporal classification of a range of different types of sound producing targets in a geographical area, the system including:
an optical signal transmitter arrangement for repeatedly transmitting, at multiple instants, interrogating optical signals into one or more of a plurality of optical fibres distributed across the geographical area and forming at least part of an installed fibre-optic communications network, wherein the installed fibre-optic communications network includes the plurality of optical fibres, and segments of the one or more of the plurality of optical fibres create a plurality of virtual dedicated sensing networks;
an optical signal detector arrangement for receiving, during an observation period following each of the multiple instants, returning optical signals scattered in a distributed manner over distance along the one or more of the plurality of optical fibres, the scattering influenced by acoustic disturbances caused by the multiple targets within the observation period;
an A/D converter for converting the optical signals to optical data;
a storage unit for storing the optical data, the optical data including temporal and location related data;
a communications interface and processor for receiving a search request including temporal and location related filters or parameters, and retrieving the optical data based on said parameters for processing it into acoustic data; and
a processing unit configured to demodulate acoustic data from the optical signals, process the acoustic data, and classify the acoustic data in accordance with the target classes or types to generate a plurality of datasets including classification, temporal and location-related data, and store the datasets in the storage unit, wherein the processing unit is configured to process the optical data into acoustic data at a resolution based on the temporal and location based parameters, the processing unit being arranged to retrieve the acoustic data at a desired resolution for beam forming at a desired location;
wherein the processing unit is configured to monitor a plurality of different footprints in the geographic area, each footprint comprising at least one virtual dedicated sensing network.

* * * * *